United States Patent
Lee

(10) Patent No.: US 7,330,705 B2
(45) Date of Patent: Feb. 12, 2008

(54) METHOD AND APPARATUS FOR CONTROLLING SPECIFIC ABSORPTION RATE IN A MOBILE COMMUNICATION TERMINAL

(75) Inventor: Ju-Byung Lee, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 613 days.

(21) Appl. No.: 10/776,117

(22) Filed: Feb. 11, 2004

(65) Prior Publication Data

US 2004/0176125 A1    Sep. 9, 2004

(30) Foreign Application Priority Data

Mar. 5, 2003   (KR) .................. 10-2003-0013572

(51) Int. Cl.
*H04B 17/00* (2006.01)
(52) U.S. Cl. .................. 455/117; 455/115.1; 455/522; 455/127.1; 455/575.5
(58) Field of Classification Search ............... 455/117, 455/127.1–127.4, 575.5, 115.1–115.4, 522
See application file for complete search history.

(56) References Cited

U.S. PATENT DOCUMENTS

| | | | | | |
|---|---|---|---|---|---|
| 5,081,713 | A | * | 1/1992 | Miyazaki ................ | 455/117 X |
| 5,524,275 | A | * | 6/1996 | Lindell ................... | 455/117 |
| 5,802,445 | A | * | 9/1998 | Wiedeman et al. ..... | 455/117 X |
| 6,018,646 | A | * | 1/2000 | Myllymaki et al. ..... | 455/117 X |

* cited by examiner

*Primary Examiner*—Philip J. Sobutka
(74) *Attorney, Agent, or Firm*—The Farrell Law Firm, PC

(57) ABSTRACT

A method and apparatus for controlling a SAR (Specific Absorption Rate) in a mobile communication terminal. The SAR is controlled by adjusting a transmission power of a mobile communication terminal. The method for controlling the SAR in a mobile terminal includes the steps of checking a user-selected SAR control mode of the mobile terminal, setting a code value corresponding to a transmission power of the RF signal to a gain of the amplifier, wherein the code value is set to a first code value when the SAR control mode is a safe mode, or is set to a second code value when the SAR control mode is a normal mode, and amplifying the RF signal according to the gain of the amplifier, such that it controls a transmission power of an RF (Radio Frequency) signal by controlling a gain of an amplifier amplifying the RF signal.

12 Claims, 2 Drawing Sheets

METHOD AND APPARATUS FOR CONTROLLING SPECIFIC ABSORPTION RATE IN A MOBILE COMMUNICATION TERMINAL

PRIORITY

This application claims priority to an application entitled "METHOD AND APPARATUS FOR CONTROLLING SPECIFIC ABSORPTION RATE IN MOBILE COMMUNICATION TERMINAL", filed in the Korean Industrial Property Office on Mar. 5, 2003 and assigned Serial No. 2003-13572, the contents of which are hereby incorporated by reference.

BACKGROUND OF THE INVENTION

1. Field of the Invention

The present invention relates generally to a method for controlling a SAR (Specific Absorption Rate) in a mobile communication terminal, and more particularly to an apparatus and method for controlling a SAR by controlling a transmission power of a mobile communication terminal.

2. Description of the Related Art

Recently, there has been an increasing controversy on the subject of whether electromagnetic waves emitted from electronic appliances are harmful to the human body. Particularly, it is well known that communication equipments directly brought into contact with the human body, for example, a mobile terminal such as a cellular phone and a PCS phone having a high SAR. Consequently, a variety of standards for protecting the human body from being exposed to harmful electromagnetic waves such as EMI (Electro-Magnetic Interference) have been recommended by national administrative organs and international organizations on the assumption that the EMI is harmful to the human body, and have been adapted as policy or recommendations in many countries. The United States has prohibited the sale of electronic appliances having a SAR of more than 1.6 W/Kg on the human head since 1997, and the MIC (Ministry of Information and Communication) in Korea has prescribed a SAR of 1.6 W/Kg as a standard for protecting the human body from EMI.

SAR, which indicates the amount of electromagnetic energy absorbed by the human body, is defined as absorption energy per mass (i.e., W/Kg) for a given time, and is expressed as follows:

$$SAR = \frac{\sigma E_i^2}{\rho} \qquad [\text{Eq. 1}]$$

where $\sigma$ is electric conductivity of a human body, $\rho$ is a density, and $E_i$ is the magnitude of electric field. The SAR in human tissue is proportional to a square of electric field intensity, and is determined in light of parameters of an incident electromagnetic field, for example, frequency, intensity, direction, source, a relative position of a target subject, dielectric properties of human tissues exposed to EMI, influence of the ground, and EMI exposure environments.

A variety of conventional methods for reducing the influence of EMI on the human head have been proposed, for example, a method for attaching an EMI shield case to a mobile terminal, or a method for arranging an antenna far away from the human head. However, these conventional methods cannot completely remove EMI emitted from a mobile terminal even though they drop a SAR down to a prescribed standard, resulting in some fear for the user of the mobile terminal. Particularly, the conventional methods have disadvantages in that a transmission power may gradually increase in a weak electric field area, and thereby users may be exposed to a maximal EMI within an allowable reference range.

SUMMARY OF THE INVENTION

Therefore, the present invention has been designed in view of the above problems, and it is an object of the present invention to provide an apparatus and method for enabling a user to freely control a SAR of a mobile terminal.

It is another object of the present invention to provide an apparatus and method for limiting a transmission power of a mobile terminal in a weak electric field area in order to reduce a SAR.

In accordance with one aspect of the present invention, the above and other objects can be accomplished by a method for controlling a SAR (Specific Absorption Rate) in a mobile terminal for controlling a transmission power of an RF (Radio Frequency) signal by controlling a gain of an amplifier for amplifying the RF signal, comprising the steps of: a) checking a user-selected SAR control mode of the mobile terminal; b) setting a code value corresponding to a transmission power of the RF signal to a gain of the amplifier, wherein the code value is set to a first code value when the user-selected SAR control mode is a safe mode, and is set to a second code value when the user-selected SAR control mode is a normal mode; and c) amplifying the RF signal according to the gain of the amplifier.

In accordance with another aspect of the present invention, there is provided a method for controlling a SAR (Specific Absorption Rate) in a mobile terminal for controlling a transmission power of an RF (Radio Frequency) signal by controlling a gain of an amplifier for amplifying the RF signal, comprising the steps of: a) checking a user-selected SAR control mode of the mobile terminal; b) if the RF signal needs to be transmitted with a high transmission power and the user-selected SAR control mode is set to a safe mode, setting a gain of the amplifier to a prescribed attenuation gain; and c) amplifying the RF signal according to the gain of the amplifier.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
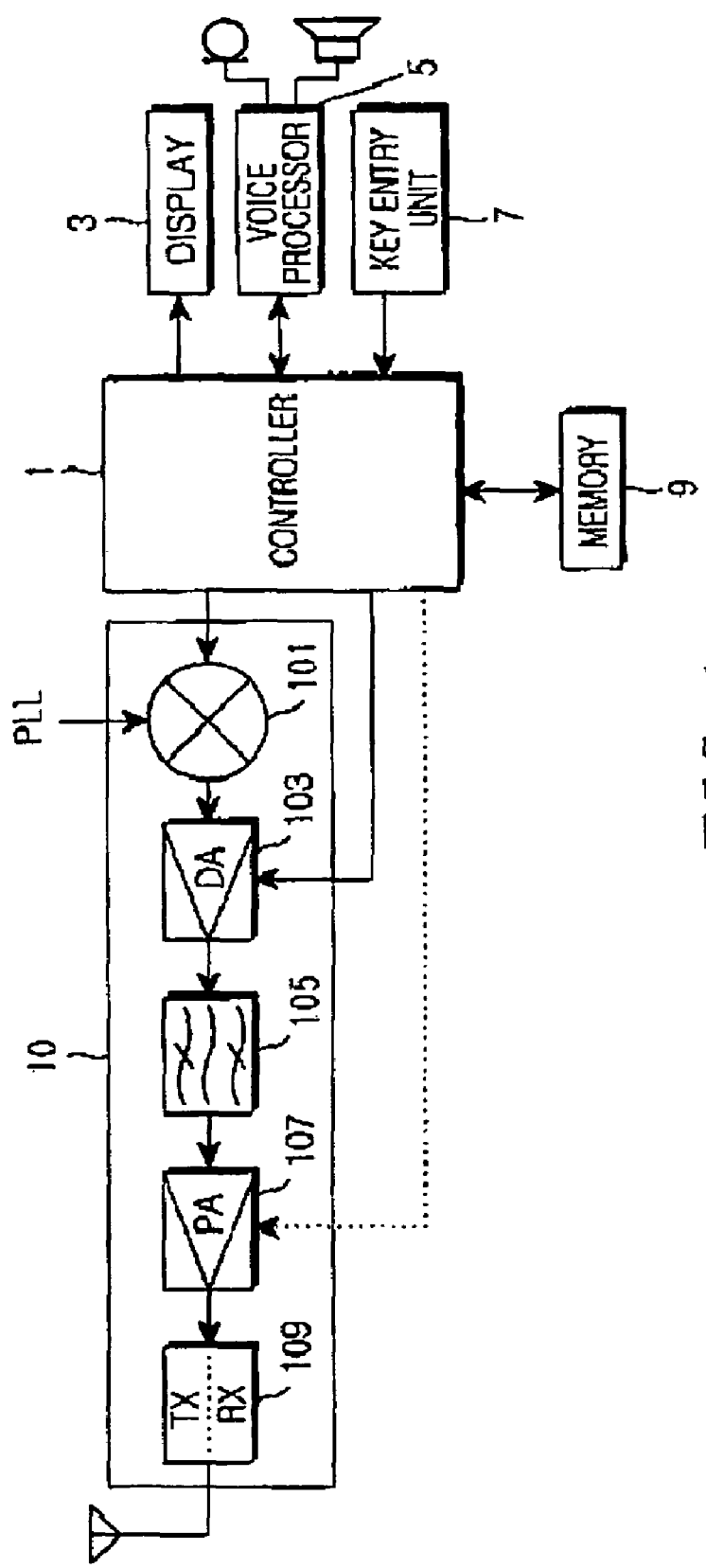
FIG. 1 is a block diagram illustrating an apparatus for controlling a SAR of a mobile terminal in accordance with a preferred embodiment of the present invention.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a block diagram illustrating an apparatus for controlling a SAR of a mobile terminal in accordance with a preferred embodiment of the present invention. Referring to FIG. 1, the apparatus for controlling the SAR of the mobile terminal includes a controller 1, a voice processor 5, a user interface unit (not shown) having a display 3 and a key entry unit 7, a memory 9, and a TPC (Transmit Power Control) unit 10. The controller 1 controls an overall operation of a mobile terminal. In a CLPC (Closed Loop Power Control) mode, the controller 1 controls a transmission power of the mobile terminal upon receiving TPC information from a BTS (Base Transceiver Station). In the case of an OLPC (Open Loop Power Control) mode, the controller 1 controls a transmission power of the mobile terminal upon receiving an intensity of a reception signal from a BTS. Particularly, the controller 1 generates a signal for controlling an amplification gain of the TPC unit 10 according to a user-selected SAR control mode of a mobile terminal. The present invention is based on the assumption that the SAR control mode is classified into a normal mode and a SAR safe mode. However, it should be noted that the SAR safe mode can be subdivided into a plurality of sub-modes according to the degree of SAR attenuation. In addition, although the present invention will hereinafter be described on the assumption that a gain of a drive amplifier 103 is controlled according to a SAR control mode, it should be noted that the present invention can also be applicable to a power amplifier 107 other than the drive amplifier 103.

The display 3 displays a variety of messages under the control of the controller 1. The voice processor 5 converts audio data received from the TPC unit 10 into audible sound through a speaker upon receiving a control signal from the controller 1, converts an audio or voice signal received through a microphone into predetermined data, and transmits the predetermined data to the TPC unit 10. The key entry unit 7 includes a plurality of number keys and a plurality of function keys, and outputs key entry data entered by user to the controller 1.

The memory 9 stores program data needed to control the mobile terminal, and also stores any data created while executing program and user data created by a user. Particularly, the memory 9 stores various SAR control mode information predetermined by a user along with code tables showing the drive amplifier's gains in response to individual SAR control modes. Representative examples are shown in Tables 1 and 2.

TABLE 1

| | Transmission Power | | | | | | | | | |
|---|---|---|---|---|---|---|---|---|---|---|
| Channel | 24 | 20 | 16 | 12 | 8 | 4 | 0 | −4 | −8 ... | −40 |
| 50 | 100 | 83 | 67 | 31 | 0 | 82 | 64 | 48 | 31 | −118 |
| 300 | 100 | 86 | 70 | 32 | 0 | 81 | 64 | 47 | 31 | −119 |
| 900 | 100 | 79 | 64 | 28 | 0 | 81 | 64 | 47 | 31 | −119 |
| 1150 | 100 | 79 | 65 | 28 | 0 | 81 | 64 | 47 | 31 | −119 |

TABLE 2

| | Transmission Power | | | | | | | | | |
|---|---|---|---|---|---|---|---|---|---|---|
| Channel | 24 | 20 | 16 | 12 | 8 | 4 | 0 | −4 | −8 ... | −40 |
| 50 | 96 | 83 | 67 | 31 | 0 | 82 | 64 | 48 | 31 | −118 |
| 300 | 96 | 86 | 70 | 32 | 0 | 81 | 64 | 47 | 31 | −119 |
| 900 | 96 | 79 | 64 | 28 | 0 | 81 | 64 | 47 | 31 | −119 |
| 1150 | 96 | 79 | 65 | 28 | 0 | 81 | 64 | 47 | 31 | −119 |

The code shown in the Tables 1 and 2 denote a plurality of relative values versus code values at a maximal transmission power of 24 dBm on the assumption that the transmission power for 1150 reverse channels is in the dynamic range from −40 dBm to 24 dBm. However, it should be noted that code values can be indicated as absolute values.

Table 1 is a code table referenced by the controller 1 when the SAR control mode is set to a normal mode, and Table 2 is a code table referenced by the controller when the SAR control mode is set to a safe mode. Individual gains of the code table shown in Table 2 are lower than those of the code table shown n Table 1 by a predetermined value at a maximal transmission power of 24 dBm. In more detail, the safe mode restricts a transmission power of a weak electric field requiring a high transmission power on the basis of the code table of Table 2, resulting in SAR attenuation. On the other hand, in an intermediate electric field or a strong electric field requiring a low transmission power, the safe mode and the normal mode have the same code values. In this case, the transmission power is determined in light of power control information received from a BTS in a closed loop power control mode, and is also determined in light of signal intensity received from the BTS in an open loop power control mode.

Although it is assumed that a weak electric field gain of a SAR safe mode is set to 96% as compared to that of a SAR normal mode in the present invention, the gain can be variable. In order to effectively reduce a SAR in the weak electric field, for which RF signals must be transmitted with a high transmission power, without excessively reducing the number of successful phone calls, weak electric field gains in the SAR safe mode should be determined in light of the relationship between a ratio of the successful phone calls and a SAR. Further, although the present invention discloses an example for reducing only a gain at a maximal transmission power, it will be understood by those skilled in the art that the present invention is applicable to other modifications such as an example for reducing individual gains attained at 20 dBm or 16 dBm at which a relatively high transmission power is required. In addition, although the safe mode and the normal mode each have code tables in the present invention, the present invention is applicable to other modifications for subtracting a prescribed value from any code value of the normal mode's code table in the safe mode while having only a code table for the normal mode.

When a gain of the power amplifier 103 is controlled according to a SAR control mode as described above, the memory 9 stores gain code tables of the power amplifier 103.

The TPC unit 10 modulates or demodulates RF signals containing audio or control data received through an antenna upon receiving a control signal of the controller 1. The TPC unit 10 includes a mixer 101, a drive amplifier 103, a BPF (Band Pass Filter) 105, a power amplifier 107, and a duplexer 109.

The mixer 101 functions as an up-converter for converting an IF (Intermediate Frequency) signal into an RF signal having a prescribed bandwidth, and mixes the IF signal with a local oscillator frequency. The drive amplifier 103 enables an output signal of the mixer 101 to be an optimal signal, and thereby enables the power amplifier 107 to sufficiently amplify the output signal of the mixer 101. Provided that the power amplifier 107 is not driven by an optimal signal, its own efficiency may be seriously deteriorated. In accordance with the present invention, an amplification factor of the drive amplifier 103 is variable with a gain control signal generated from the controller 1. The BPF 105 selects only a transmission (Tx) frequency, performs a band-pass-filtering on the selected transmission frequency with a low insertion loss, and removes the remaining unnecessary frequencies, i.e., frequencies other than the selected transmission frequency. The power amplifier 107 amplifies RF signals generated from the BPF 105 such that a signal with the sufficient power is transmitted from the mobile terminal to a BTS through the antenna.

Figure 2:
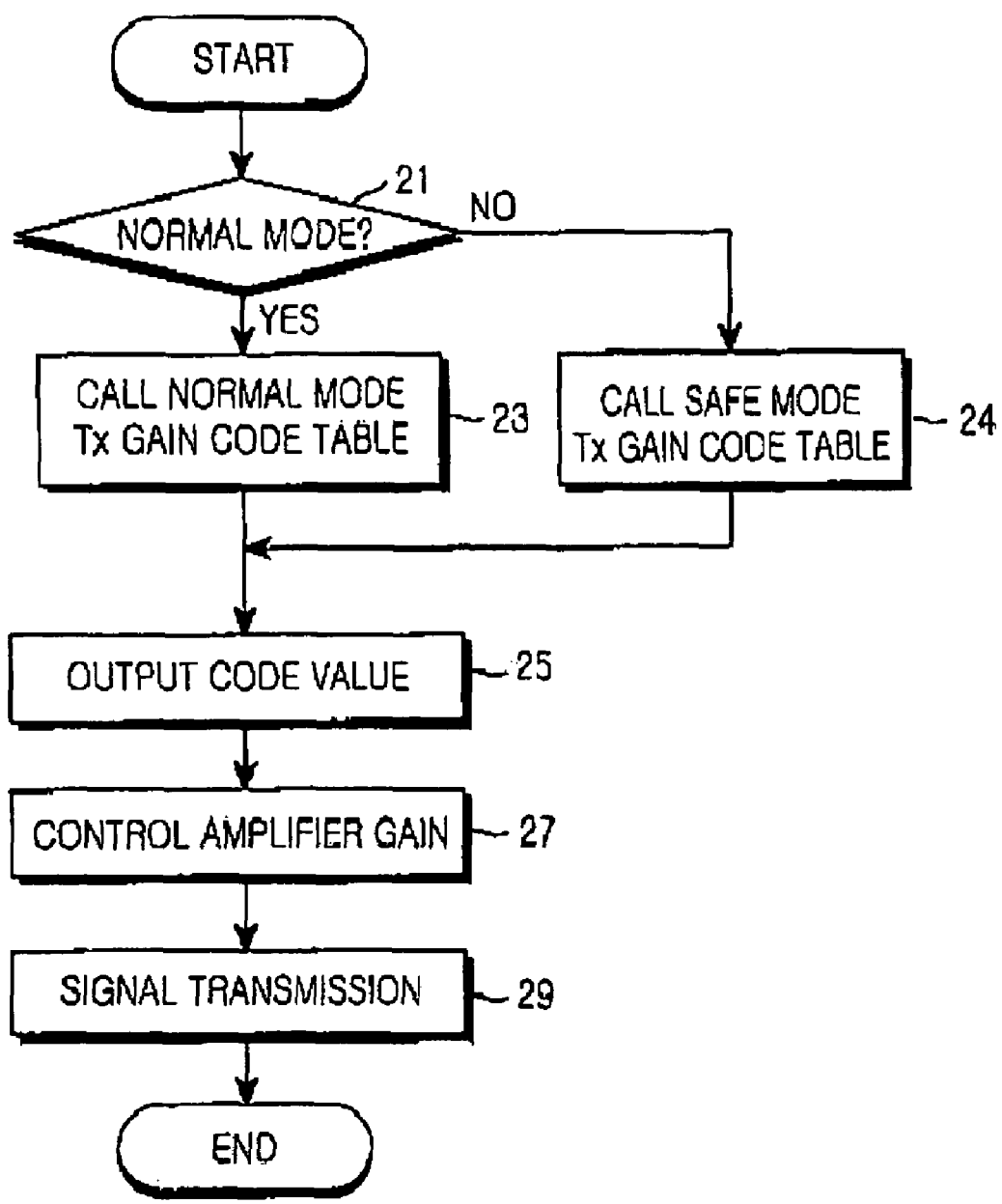
FIG. 2 is a flow chart illustrating a method for controlling a SAR of a mobile terminal in accordance with the preferred embodiment of the present invention.

FIG. 2 is a flow chart illustrating a method for controlling a SAR of a mobile terminal in accordance with the preferred embodiment of the present invention. Referring to FIG. 2, the mobile terminal controller 1 checks a SAR control mode selected by a user in step 21. The controller 1 provides a user with a user interface for setting up the SAR control mode. Typically, the user interface adds a SAR control mode setup function to a selection menu of a mobile terminal, and enables a user to select either a safe mode or a normal mode on the key entry unit 7. Information of the SAR control mode selected by a user is stored in the memory 9. Such SAR control mode information may be indicated as a flag.

Where the SAR control mode is set to a normal mode in step 21, the controller 1 calls a gain code table of a drive amplifier in association with the normal mode stored in the memory 9 in step 23. Although the present invention will control a gain of the drive amplifier 103 according to a SAR control mode, the present invention may also control that of the power amplifier. On the other hand, when the SAR control mode is set to a safe mode in step 21, the controller 1 calls a gain code table of a drive amplifier in association with a safe mode stored in the memory 9 in step 24, and then proceeds to step 25.

The controller 1 outputs a code value in response to a transmission power selected by either one of code tables in step 25. In a closed loop power control mode, the controller 1 selects a code value in response to TPC information received from a BTS. In an open loop power control mode, the controller 1 selects a code value in response to signal intensity received from the BTS. The controller 1 controls a gain of the drive amplifier 103 according to the selected code value in step 27. RF signals pre-amplified at the drive amplifier 103 are re-amplified at the power amplifier 107 over the BPF 105, and then transmitted over a duplexer 109 in step 29.

As is apparent from the description above, an apparatus and method for controlling a SAR of a mobile terminal according to the present invention enables a user to freely select a desired SAR, resulting in more reliability of a mobile terminal for the user. That is, the present invention attenuates a SAR according to a user's selection, resulting in less danger for the user to be exposed to EMI, and providing greater convenience to the user.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling SAR (Specific Absorption Rate) in a mobile terminal for controlling a transmission power of an RF (Radio Frequency) signal by controlling a gain of an amplifier for amplifying the RF signal, comprising the steps of:
    a) checking a user-selected SAR control mode of the mobile terminal;
    b) setting a code value corresponding to a transmission power of the RF signal to a gain of the amplifier, wherein the code value is set to a first code value when the user-selected SAR control mode is a safe mode, and is set to a second code value when the user-selected SAR control mode is a normal mode; and
    c) amplifying the RF signal according to the gain of the amplifier;
    d) calling a corresponding code table according to the user-selected SAR control mode; and
    e) calculating a code value versus a transmission power to be transmitted on the basis of the called code table.

2. The method as set forth in claim 1, wherein the amplifier is a drive amplifier.

3. The method of claim 1, wherein the code value is selected from code tables wherein individual transmission powers and individual codes are interconnected with each other.

4. The method as set forth in claim 1, wherein the first code value is lower than the second code value when the RF signal is transmitted with a high transmission power.

5. The method as set forth in claim 4, wherein the first code value is equal to the second code value when the RF signal is transmitted with a low transmission power.

6. The method as set forth in claim 1, wherein a code value corresponding to a maximal transmission power in a code table for the safe mode is lower than a corresponding code value in a code table for the normal mode.

7. The method as set forth in claim 6, wherein the amplifier is a drive amplifier.

8. A method for controlling SAR (Specific Absorption Rate) in a mobile terminal for controlling a transmission power of an RF (Radio Frequency) signal by controlling a gain of an amplifier for amplifying the RF signal, comprising the steps of:
    a) checking a user-selected SAR control mode of the mobile terminal;
    b) if the RF signal is to be transmitted with a high transmission power and the SAR control mode is set to a safe mode, setting the gain of the amplifier to a prescribed attenuated gain; and
    c) amplifying the RF signal according to the gain of the amplifier;
    d) calling a corresponding code table according to the checked SAR control mode; and
    e) calculating a code value versus a transmission power to be transmitted on the basis of the called code table, and setting the gain of the amplifier according to the code value.

9. The method as set forth in claim 8, wherein the mobile terminal provides a user with a user interface, enabling the user to select the SAR control mode.

10. The method as set forth in claim 8, further comprising the step of setting the gain of the amplifier to a prescribed normal gain if the SAR control mode is a normal mode.

11. The method of claim 10, wherein the safe mode and the normal mode are selected from code tables wherein individual transmission powers and individual codes are interconnected with each other.

12. A mobile communication terminal including an amplifier for amplifying and transmitting an RF (Radio Frequency) signal, comprising:
   a user interface for selecting a SAR (Specific Absorption Rate) control mode of the mobile terminal;
   a memory for storing program data for controlling the mobile terminal, and storing information of the SAR control mode and code tables of amplifier gains corresponding to individual SAR control modes; and
   a controller for setting a first code value of the memory indicating a gain of the amplifier when the SAR control mode is a safe mode, setting a second code value of the memory indicating a gain of the amplifier when the SAR control mode is a normal mode, and amplifying the RF signal according to the gain of the amplifier.

* * * * *